United States Patent [19]

David, Jr. et al.

[11] Patent Number: 4,473,275

[45] Date of Patent: Sep. 25, 1984

[54] METHOD AND APPARATUS FOR IMPROVING THE EFFICIENCY OF AN ACOUSTO-OPTIC DEFLECTOR

[75] Inventors: Edward H. David, Jr.; Otis G. Zehl, both of College Park; Michael G. Price, Seakbrook, all of Md.

[73] Assignee: Litton Systems, Inc., College Park, Md.

[21] Appl. No.: 342,456

[22] Filed: Jan. 25, 1982

[51] Int. Cl.³ .............................................. G02F 1/33
[52] U.S. Cl. ................................................... 350/358
[58] Field of Search ........................... 350/358, 162.12

[56] References Cited

U.S. PATENT DOCUMENTS

| | | | |
|---|---|---|---|
| 3,492,063 | 1/1970 | Lee | 350/356 |
| 3,691,477 | 9/1972 | Janney | 356/350 |
| 3,923,380 | 12/1975 | Hattori et al. | 350/356 |
| 3,988,055 | 10/1976 | McNaney | 350/358 |
| 4,390,247 | 6/1983 | Freyre | 350/358 |
| 4,443,066 | 4/1984 | Freyre | 350/358 |

Primary Examiner—John K. Corbin
Assistant Examiner—Lynn Vandenburgh Kent
Attorney, Agent, or Firm—Robert F. Rotella; Michael H. Wallach

[57] ABSTRACT

An acousto-optic deflector or modulator is shown which diffracts a beam of incident light from a zero order beam into a first order beam. Normally such diffraction deflects but 1% of the light energy within the incident beam. This deflection may be improved by successive transits of the light beam across the acoustic energy wave within the deflector.

17 Claims, 6 Drawing Figures

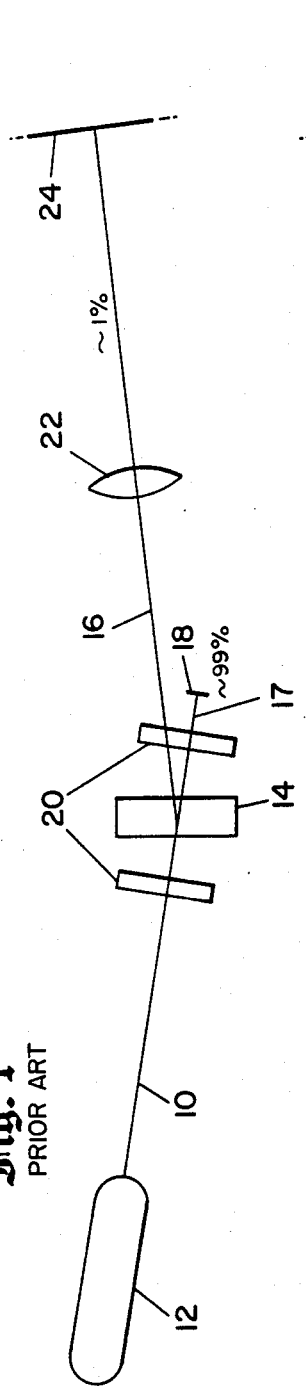
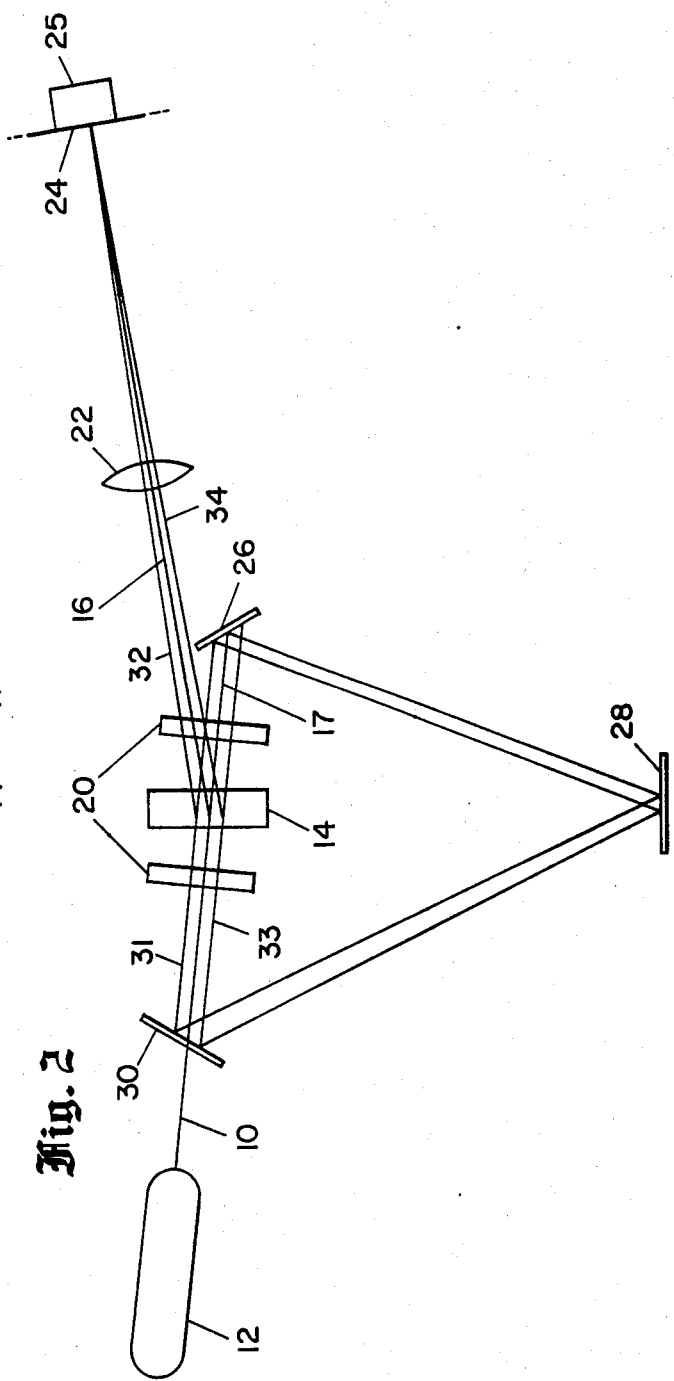
Fig. 1 PRIOR ART
Fig. 2

METHOD AND APPARATUS FOR IMPROVING THE EFFICIENCY OF AN ACOUSTO-OPTIC DEFLECTOR

BACKGROUND OF THE INVENTION

1. Field of the Invention

The present invention relates to a method and apparatus for improving the efficiency of an acousto-optic deflector or Bragg cell by successively returning the undeflected light in the zero order beam back through the acoustic wave within the cell. This allows successive acousto-optic interactions to take place for increasing the overall deflection efficiency.

2. Description of Prior Art

The term acousto-optics (A/O) refers to an interaction of light and sound. Typically an RF input signal is first transformed into an acoustic wave in a suitable crystal material, such as lithium niobate. Variation in index of refraction due to the propagation of the acoustic wave within the crystal can be then used to deflect a beam of light, usually monochromatic. This process is the equivalent of the better known Bragg diffraction of X-rays from the planes of a crystal lattice; for this reason the device is called a Bragg deflector or Bragg cell as well as an acousto-optic deflector or modulator. The angular deflection of the optical beam is proportional to the frequency of the original RF input signal. As the process is linear, multiple simultaneous RF input signals yield multiple simultaneous beam deflections corresponding to the distinct input frequencies with the intensity of the individual deflected beams being proportional to the power of the original RF input signal.

Acousto-optics has been used for a variety of applications where light must be modulated or deflected. An important application is the use of acousto-optics for wideband receiving systems. The acousto-optic phenomenon occurs over a substantial bandwidth, 1 GHz with existing devices, so that the frequency content of an unknown signal environment can be resolved by measuring the angle of deflection corresponding to each signal in the environment. Thus, the entire signal environment may be viewed simultaneously by a device that acts like a channelized receiver.

One major problem with such wideband A/O receiver systems has not yet been resolved; dynamic ranges of experimental systems are disappointingly small, on the order of 30 dB for 100 nanoseconds response time. For this technology to be applicable to a practical receiver system design, improvements in dynamic range will be required. A number of factors contribute to this problem. Wideband Bragg cells are characteristically poor deflectors of light, deflecting typically less than 1% of the available optical power. The maximum deflected optical power is limited by Bragg cell material properties, transducer power handling capability, and available laser power. The deflected light output from a typical wideband Bragg cell has a two-tone spurious response free dynamic range of about 50 dB, for two signals at maximum amplitude. A dynamic range of even 40 dB cannot normally be realized in a system, however, due to limitations associated with sensing the optical signals. Photodiode sensitivity is limited by thermal noise of diode resistance. As video bandwidth is increased to guarantee acquisition of short (100–500 nanosecond) RF pulses, the sensitivity of the diode decreases. For example, typical operating conditions of the combination oi a 1 GHz lithium niobate Bragg cell and a 3 MHz video bandwidth PIN photodiode sensor in combination limit the dynamic range to only 30 dB.

Several approaches may yield enhanced deflection efficiency for wideband Bragg cell systems. Increased transducer power handling capabilities are possible, and increased deflection efficiencies can be achieved through the use of multiple transducers. Acoustic beam steering, to optimize the interaction region of light and sound, is a further approach which may be utilized with multiple transducer designs to yield increased deflection efficiency. Each of these proposed approaches has major drawbacks, and the gains to be expected from them are relatively small.

A need therefore continues to exist for a wideband (greater than 1 GHz bandwidth) A/O system having a deflection efficiency greater than 1% per watt.

Prior art devices which incorporate electro-optic modulators have been used in surface acoustic wave (SAW) systems to control the wave. The electro-optic modulators operate to deflect a beam of electromagnetic energy by the application of an electric field to the crystaline material of the modulator. These devices use a multiplicity of passes of the beam of light to increase beam deflection which is inherently small in such devices, see U.S. Pat. No. 3,492,063, by Tzuo-Chang Lee; or to create interference to modulate beam intensity, see U.S. Pat. No. 3,923,380, by Shuzo Hattori et al. and U.S. Pat. No. 3,813,142, by Carl F. Buhrer.

None of the prior art devices known address the problem of increasing the intensity of the deflected first order beam from an acousto-optic deflector.

SUMMARY OF THE INVENTION

Accordingly, an important object of the present invention is to improve the deflection efficiency of an acousto-optic deflector or Bragg cell.

This object may be accomplished by successive transits of a beam of electromagnetic energy to be deflected across the acoustic energy wave formed in the Bragg cell.

Such successive and multiple transits may be accomplished by the return of the undeflected portion of the zero order beam of electromagnetic energy from the Bragg cell back to the cell input aperture for multiple and successive interactions with the acoustic wave front. The optical power density within the acoustic beam and the deflection efficiency of the cell is thereby improved. Improved deflection efficiency corresponds directly to improved A/O system dynamic range.

BRIEF DESCRIPTION OF THE DRAWINGS

Other objects and advantages of the present invention will become apparent to those skilled in the art after consideration of the following specification wherein:

FIG. 1 is a schematic diagram of an acousto-optic deflector system of the prior art;

FIG. 2 is a schematic diagram of an acousto-optic deflector system incorporating apparatus of the present invention;

DETAILED DESCRIPTION OF THE PREFERRED EMBODIMENTS

Figure 3:
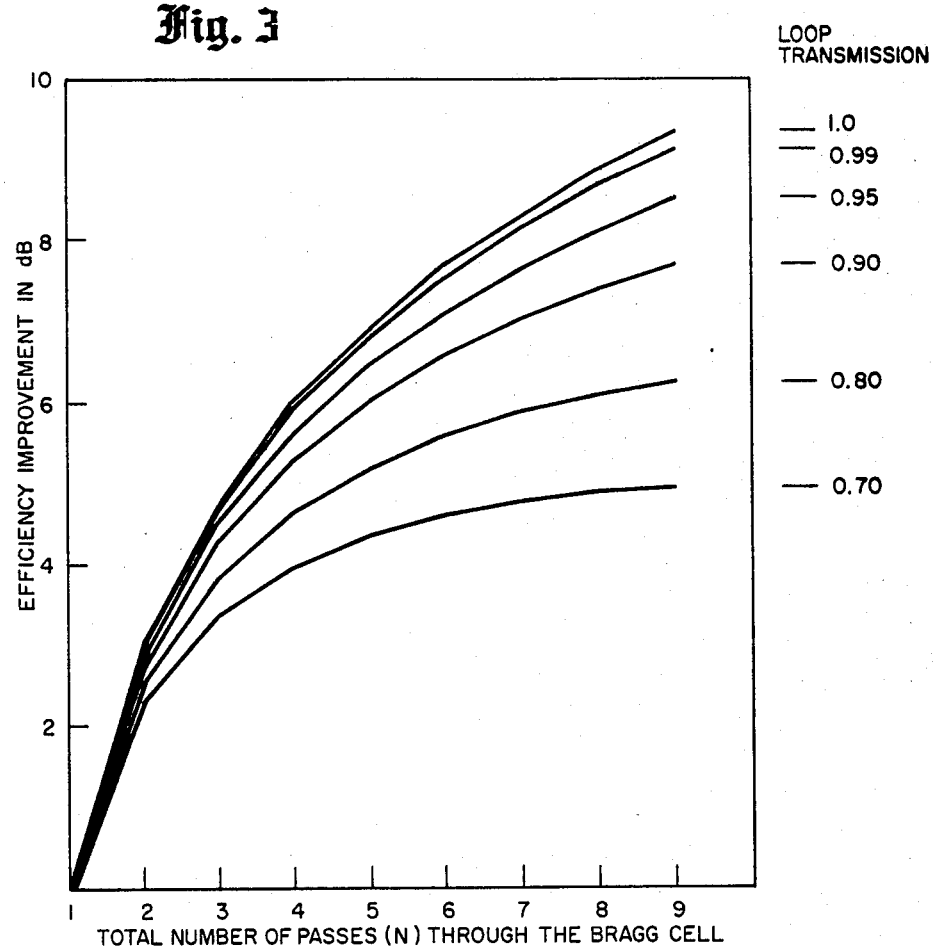
FIG. 3 is a graph of the deflection efficiency improvement as a function of the total number of transits by a beam of electromagnetic energy through a Bragg cell vs. the optical transmission of the cell media.

Typical operation of a prior art acousto-optic modulator is shown in FIG. 1. Electromagnetic energy, in the form of a light beam 10, from a laser source 12 is directed to an acousto-optic deflector or Bragg cell 14 wherein a portion of that light beam 10 is deflected by diffraction, caused by the passage of an acoustic energy wave through the medium of the cell, into a deflected or first order beam 16 with the remainder of the undeflected or zero order beam 17 stopped by optical stop 18. A cylinder lens pair 20 serves to compress the light into the Bragg cell acoustic wave and recollimate it upon exiting the Bragg cell. The deflected light beam 16 passes through a transform lens 22 and appears as a blur spot in the focal plane 24, where its position and intensity are sensed by photosensor means 25. Since the deflection efficiency of typical wideband Bragg cells is less than 1%, most of the electromagnetic energy from the light beam 10 is wasted by loss at optical stop 18.

FIG. 2 shows an embodiment of the apparatus of the present invention. The undeflected light 17, which before was wasted, is returned into the Bragg cell 14 via a series of mirrors 26, 28 and 30 for successive transits and interactions with the acoustic energy wave within the Bragg cell. Two successively returned beams are shown as beams 31 and 33. Mirror 30 has an aperture at the center to permit the original laser beam 10 to pass therethrough on its first transit of the Bragg cell 14. Diffracted beams 16, 32 and 34 from each transit of light through the sound beam are collected by the transform lens 22 into a blur spot at the focal plane 24.

The successive transits of light exposed to successive acoustic-optic interactions within the Bragg cell 14 causes the optical power density within the acoustic beam and, therefore, the deflection efficiency of the cell, to be improved. Improved deflection efficiency corresponds directly to improved A/O system dynamic range.

It will be noted from FIG. 2 that the returned undiffracted light within beam 17 which is redirected back into the Bragg cell 14 by mirrors 26, 28 and 30 follows a slightly different optical path.

On the first transit of light 10 through the cell 14, the amount of light deflected by diffraction into the first order beam is $\eta_0 PI_1$, where $\eta_0$ is the Bragg cell efficiency, P is the acoustic power within the cell, and $I_1$ is the optical power available from the laser. The efficiency after a total of N passes can be shown to be:

$$\eta_N = \eta_0(1-T^N/1-T)$$

where T is the combined loop optical transmission coefficient. This expression is just a truncated form of the geometric series:

$$\eta_\infty = \eta_0(1+T+T^2+\ldots)$$

FIG. 3 shows the efficiency improvement (in dB) as a function of the total number of transmits of light through the Bragg cell 14 and the optical loop transmission of the feedback path. For an optical loop transmission of 0.8 and a total of 5 transits of light through the Bragg cell, the improvement in efficiency would be about 5 dB.

As shown in FIG. 3, an improved optical loop transmission will result in an improved efficiency for the A/O system. Through the use of quarter-wave anti-reflection coatings, a transmission efficiency of 0.95 is not impossible. In such a system, 5 transmits will improve the system efficiency by greater than 6.5 dB.

Figure 4:
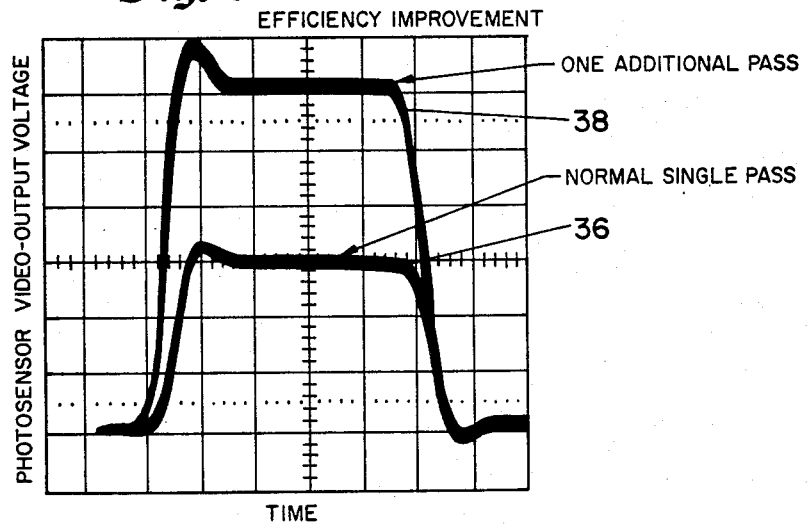
FIG. 4 is an experimental oscilloscope trace of light intensity in the acousto-optic focal plane of a Bragg cell showing increased deflection efficiency for a single additional transit of electromagnetic energy through the acoustic energy wave of the Bragg cell in accordance with this invention.

The foregoing was verified experimentally as shown in FIG. 4. Here the output voltage of the photosensor 25 upon which the first beam 16 (deflected beam) from the Bragg cell 14 has been focussed is plotted against time at 36. The zero order beam 17 (undeflected beam) has been redirected through the Bragg cell 14 a second time to be again partially deflected into the first order beam which is focused upon focal plane 26 by lens 22. The improved voltage output from this second transit of the acoustic energy beam is shown at 38 in FIG. 4. This illustrates an increase in output voltage from an average peak voltage of 4 volts to 7 volts. A chopper was used to interrupt the path of the zero order beam so that a normal first order beam might be compared on the same oscilloscope with a first order beam having one additional transit through the Bragg cell 14.

Figure 5B:
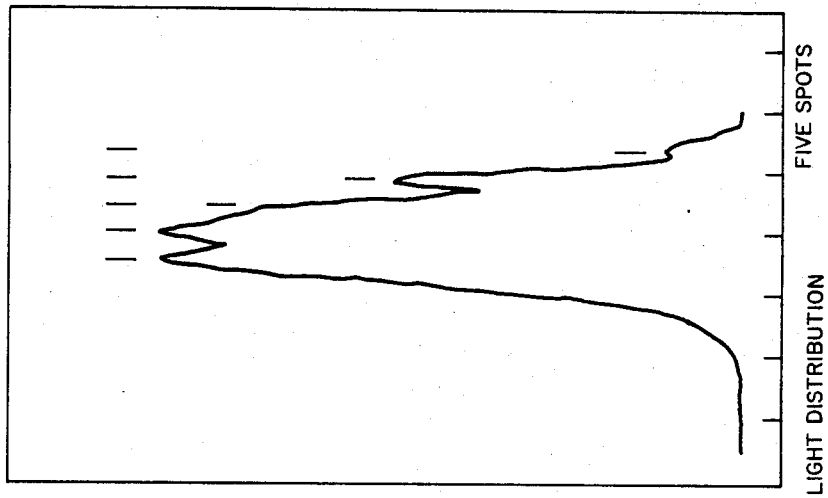
FIG. 5b shows multiple transits in accordance with this invention.
Figure 5A:
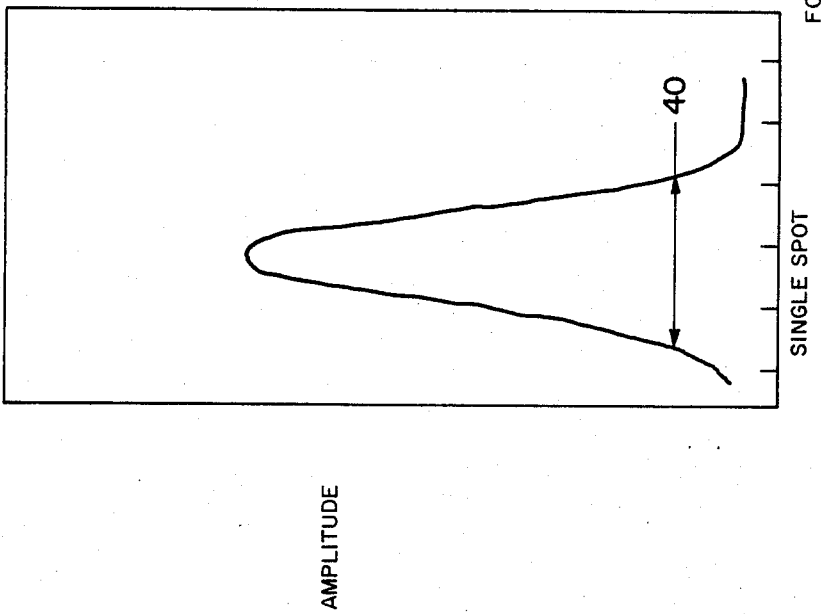
FIG. 5a shows the transformed focal plane light distribution for a continuous signal with a single transit.

The offset of the multiple light beams 16, 32 and 34 causes the blur spot upon the photosensor 25 to spread slightly with a plurality of slightly separated spots. Through the use of a pinhole and a photometer, the light intensity at the photosensor 25 has been plotted vs. position. FIG. 5a shows the intensity as an output amplitude of a photometer connected to photosensor 25 for a single pass of the beam of electromagnetic energy through the Bragg cell 14, having a beam width 40, while FIG. 5b shows the intensity for five passes.

The present invention lends itself to a method of increasing the efficiency of a Bragg cell or acousto-optic deflector through the simple steps of directing the zero order beam of electromagnetic energy a plurality of times through the acoustic wave within the Bragg cell. With each transit, the amount of energy diffracted by the cell is increased. Additional steps may include focusing the collimated light into a narrow light beam within the acoustic wave which permits more efficient interaction, and the offsetting of successive transits to prevent interference between successive transits of the acoustic wave.

The use of a three-mirror system, as shown, requires that the final mirror 30 before the Bragg cell 14 have an aperture through which the original beam 10 may pass. Each redirected beam 31, 33 . . . n is displaced on alternate sides of the original beam. A four-mirror system can be constructed in which the redirected beams are offset on but one side of the original beam 10. Further, the mirrors may be replaced by reflection devices, such as prisms. Wave guides, such as an optical fiber or fibers, may also be used to implement the redirection of the zero order beam back through the Bragg cell. Accordingly, the present invention should be limited only by the appended claims.

We claim:

1. A method for improving the amount of electromagnetic energy deflected into a first order beam by an acousto-optic deflector, comprising the steps of:

directing a beam of electromagnetic energy into an acousto-optic deflector wherein said beam passes through an acoustic energy wave generated within said deflector which deflects said first order beam from a zero order beam;

successively directing said zero order beam through multiple transits of said acoustic energy wave wherein the efficiency of said acousto-optic deflector is improved.

2. A method of improving the amount of electromagnetic energy deflected into a first order beam by an acousto-optic deflector, comprising the steps of:

directing a beam of electromagnetic energy into an acousto-optic deflector along a first path such that the angle of incidence of said beam upon said acousto-optic deflector is substantially equal to the Bragg angle of the medium of said acousto-optic deflector;

dividing said beam of electromagnetic energy in said acousto-optic deflector from a zero-order beam, which passes directly through said deflector, into at least a first order beam which is diffracted by the interaction of acoustic energy within said deflector medium;

capturing the electromagnetic energy in the zero order beam from said acousto-optic modulator;

redirecting said captured electromagnetic energy substantially along said first path in said acousto-optic deflector;

redividing said redirected electromagnetic energy into said zero-order and first order beams for improving the efficiency of said acousto-optic deflector.

3. The method as claimed in claim 2, wherein said step of redirecting said captured electromagnetic energy includes the step of:

reflecting said electromagnetic energy with a plurality of mirrors.

4. The method as claimed in claim 2, wherein said step of redirecting said captured electromagnetic energy includes the step of:

guiding said electromagnetic energy with wave guides.

5. The method as claimed in claim 2, wherein said step of redirecting said captured electromagnetic energy includes the step of:

reflecting said electromagnetic energy with prisms.

6. The method as claimed in claim 2, additionally comprising the step of:

focusing the beam of electromagnetic energy to a near point within said acoustic wave generated by said acousto-optic deflector.

7. The method as claimed in claim 2, additionally comprising the step of:

offsetting each beam of redirected electromagnetic energy as it transits said acoustic wave.

8. In an acousto-optic system including a beam of electromagnetic energy directed along a path through an acousto-optic deflector and through a wave of acoustic energy generated therein which diffracts said beam of electromagnetic energy from a zero order beam on the exit side of said acoustic energy wave into at least a first order beam by the interaction of acoustic energy within said deflector, the improvement comprising:

means for redirecting said zero order beam of electromagnetic energy substantially along said path and again through said wave of acoustic energy wherein said redirected electromagnetic energy beam is again diffracted from said zero order beam into said first order beam to improve the efficiency of said acousto-optic system.

9. In an acousto-optic system, as claimed in claim 8, the improvement additionally comprising:

said means for redirecting said zero order beam of electromagnetic energy substantially along said path and again through said wave of acoustic energy including means for redirecting said zero order beam a plurality of times through said wave of acoustic energy.

10. An acousto-optic system, comprising:

a source of electromagnetic energy which forms a beam thereof;

an acousto-optic deflector through which said beam of electromagnetic energy is directed to exit as a zero order beam;

means for generating an acoustic energy wave within said deflector through which said beam of electromagnetic energy transits for diffracting a first order beam from said zero order beam;

means for redirecting said zero order beam through multiple transits of said acoustic energy wave to diffract additional energy from said beam of electromagnetic energy into said first order beam for improving the efficiency of said acousto-optic system.

11. An acousto-optic system, as claimed in claim 10, wherein:

said means for redirecting said zero order beam is a plurality of mirrors.

12. An acousto-optic system, as claimed in claim 10, wherein:

said means for redirecting said zero order beam is a wave guide.

13. An acousto-optic system, as claimed in claim 10, wherein:

said means for redirecting said zero order beam is a plurality of prisms.

14. An acousto-optic system, as claimed in claim 10, wherein:

said means for redirecting said zero order beam includes a three-mirror system wherein one mirror has an aperture through which said beam of electromagnetic energy is passed prior to being directed through said deflector.

15. An acousto-optic system, as claimed in claim 10, wherein:

said means for redirecting said zero order beam includes a four-mirror system.

16. An acousto-optic system, as claimed in claim 10, additionally comprising:

lens means for focusing said beam of electromagnetic energy into a narrow beam within said acoustic energy wave.

17. An acousto-optic system, as claimed in claim 10, additionally comprising:

said means for redirecting said zero order beam through multiple transits of said acoustic energy wave include means for offsetting each redirected beam.

* * * * *